United States Patent [19]

Apelian et al.

[11] Patent Number: 5,238,677
[45] Date of Patent: Aug. 24, 1993

[54] PROCESS FOR THE DEALUMINATION OF MORDENITE

[75] Inventors: Minas R. Apelian, Vincetown; Thomas F. Degnan, Moorestown, both of N.J.

[73] Assignee: Mobil Oil Corp., Fairfax, Va.

[21] Appl. No.: 898,614

[22] Filed: Jun. 15, 1992

[51] Int. Cl.$^5$ ............................................... C01B 33/34
[52] U.S. Cl. ........................... 423/714; 423/DIG. 25; 502/78; 502/85
[58] Field of Search ............... 423/326, 328, 329, 330, 423/714, DIG. 25; 502/78, 85

[56] References Cited

U.S. PATENT DOCUMENTS

| | | | |
|---|---|---|---|
| 3,442,795 | 5/1969 | Kerr et al. | 208/120 |
| 3,551,353 | 12/1970 | Chen et al. | 423/328 |
| 4,002,697 | 1/1977 | Chen | 260/671 M |
| 4,088,605 | 5/1978 | Rollmann | 252/465 Z |
| 4,100,215 | 7/1978 | Chen | 260/671 M |
| 4,101,595 | 7/1978 | Chen et al. | 260/668 A |
| 4,388,177 | 6/1983 | Bowes et al. | 208/111 |
| 4,520,221 | 5/1985 | Chen | 585/517 |
| 4,568,786 | 2/1986 | Chen et al. | 585/517 |
| 4,716,135 | 12/1987 | Chen | 502/62 |
| 5,043,307 | 8/1991 | Bowes et al. | 502/86 |
| 5,080,878 | 1/1992 | Bowes et al. | 423/328 |

FOREIGN PATENT DOCUMENTS

0259526B1 9/1991 European Pat. Off.

Primary Examiner—R. Bruce Breneman
Attorney, Agent, or Firm—Alexander J. McKillop; Dennis P. Santini; Lori F. Cuomo

[57] ABSTRACT

A process for the dealumination of a zeolite having the structure of mordenite by contacting the zeolite with dicarboxylic acid, such as oxalic acid, and steaming. The process is useful for the dealumination of TEA mordenite.

21 Claims, No Drawings

PROCESS FOR THE DEALUMINATION OF MORDENITE

CROSS-REFERENCE TO RELATED APPLICATIONS

This application is related by subject matter to co-pending applications Ser. Nos. 07/828,624, filed Jan. 31, 1992; 07/881,281, filed May 11, 1992; 07/881,282, filed May 11, 1992; and 07/898,615, filed Jun. 15, 1992.

FIELD OF THE INVENTION

This application is directed to a process for the dealumination of a zeolite having the structure of mordenite by contacting with dicarboxylic acid and steaming.

BACKGROUND OF THE INVENTION

Zeolitic materials, both natural and synthetic, have been demonstrated to have catalytic properties for various types of hydrocarbon conversion and chemical processing. It is often advantageous to dealuminate these materials in order to improve their process performance. Performance measures include product selectivity, product quality and catalyst stability.

Conventional techniques for zeolite dealumination include hydrothermal treatment, mineral acid treatment with HCl, $HNO_3$, and $H_2SO_4$, and chemical treatment with $SiCl_4$ or EDTA. The treatments are limited, in many cases, in the extent of dealumination by the onset of crystal degradation and loss of sorption capacity.

U.S. Pat. No. 3,442,795 to Kerr et al. describes a process for preparing highly siliceous zeolite-type materials from crystalline aluminosilicates by means of a solvolysis, e.g. hydrolysis, followed by a chelation. In this process, the acid form of a zeolite is subjected to hydrolysis, to remove aluminum from the aluminosilicate. The aluminum can then be physically separated from the aluminosilicate by the use of complexing or chelating agents such as ethylenediaminetetraacetic acid or carboxylic acid, to form aluminum complexes that are readily removable from the aluminosilicate. The examples are directed to the use of EDTA to remove alumina.

U.S. Pat. No. 3,551,353 to Chen et al. discloses the dealumination of mordenite by contacting with steam and mineral acid in alternate steps. Hydrochloric acid is the preferred mineral acid.

U.S. Pat. No. 4,052,472 to Givens et al. discloses the use of mordenite catalysts having a silica to alumina ratio greater than 15 for conversion of alkanols. Natural mordenites subject to conventional dealumination may be used. Synthetic mordenites, with or without further dealumination, may also be used in the conversion process.

EP 0 259 526 B1 discloses the use of dealumination in producing ECR-17. The preferred dealumination method involves a combination of steam treatment and acid leaching, or chemical treatments with silicon halides. The acid used is preferably a mineral acid, such as HCl, $HNO_3$ or $H_2SO_4$, but may also be weaker acids such as formic, acetic, citric, oxalic, tartaric acids and the like.

U.S. Pat. No. 4,388,177 discloses modifying the shape selectivity of natural ferrierite by treating with oxalic acid to impart catalytic activity.

Therefore, it is an object of the present invention to provide a process for dealumination of a zeolite having the structure of mordenite to reduce the acidity of the catalyst. It is a further object of the present invention to increase the silica to alumina ratio in a zeolite having the structure of mordenite. It is a further object of the present invention to improve process performance of a zeolite having the structure of mordenite.

SUMMARY OF THE INVENTION

The present invention provides a process for the dealumination of a zeolite having the structure of mordenite by contacting the zeolite with dicarboxylic acid and steaming. The treatment with dicarboxylic acid is believed to remove aluminum from the crystalline framework of the zeolite via a chelating mechanism. Steaming is believed to provide even further removal of aluminum from the crystalline framework of the zeolite. The dicarboxylic acid/steam treatment of this invention results in the production of a low acidity mordenite.

The invention therefore includes a process for the dealumination of a zeolite having the structure of mordenite, which comprises contacting said zeolite having the structure of mordenite with dicarboxylic acid and steaming for a sufficient time to effect dealumination.

DETAILED DESCRIPTION OF THE INVENTION

The process of this invention is useful for the dealumination of a zeolite having the structure of mordenite. Mordenite is a crystalline aluminosilicate zeolite having a robust framework structure. The crystal structure, X-ray diffraction pattern and other properties of mordenite are described in pertinent portions (e.g. p. 231) of the book *Zeolite Molecular Sieves* by Donald W. Breck, published by John Wiley, New York, N.Y. (1974), incorporated herein by reference.

It is well known that the crystalline zeolites, including mordenite, have a structure consisting of a porous, robust framework. The framework consists principally of silicon tetrahedrally coordinated and interconnected with oxygen bridges. Other framework components may include Group IIIB elements of the Periodic Table, e.g. aluminum, boron and gallium, and iron.

The zeolite having the structure of mordenite may be TEA mordenite. The synthesis of TEA mordenite is described in U.S Pat. No. 4,052,472 and European Patent Application 0 384 997, incorporated herein by reference.

Prior to or following the dealumination process of the present invention it may be desirable to incorporate the zeolite with another material resistant to the temperature and other conditions employed in the process. Such matrix materials include synthetic or natural substances as well as inorganic materials such as clay, silica and/or metal oxides, such as titania or zirconia. The latter may be either naturally occurring or in the form of gelatinous precipitates or gels including mixtures of silica and metal oxides. Naturally occurring clays which can be composited with the zeolite include those of the montmorillonite and kaolin families. These clays can be used in the raw state as originally mined or initially subjected to calcination, acid treatment or chemical modification. These materials, i.e. clays, oxides, etc., function, in part, as binders for the catalyst.

In addition to the foregoing materials, the zeolites may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia, and silica-magnesia-zirconia. The matrix may be in the form of a cogel. The relative proportions of zeolite component and inorganic oxide gel matrix may vary widely with the zeolite content ranging from between 1 to 99, more usually 5 to 80, percent by weight of the composite.

Suitable dicarboxylic acids for use in the process of this invention include oxalic, malonic, succinic, glutaric, adipic, maleic, phthalic, isophthalic, terephthalic, fumaric, tartaric or mixtures thereof. Oxalic acid is preferred. The dicarboxylic acid may be used in solution, such as an aqueous dicarboxylic acid solution.

Generally, the acid solution has a concentration in the range from about 0.01 to about 4M. Preferably, the acid solution concentration is in the range from about 1 to about 3M.

The dicarboxylic acid is generally in a volume solution to volume catalyst ratio of at least about 1:1, preferably at least about 4:1.

Treatment time with the dicarboxylic acid solution is as long as required to provide the desired dealumination. Generally the treatment time is at least about 10 minutes. Preferably, the treatment time is at least about 1 hour.

More than one dicarboxylic acid treatment step may be employed in the process of the present invention for enhanced dealumination.

The dicarboxylic acid treatment temperature is generally in the range from about 32° F. to about reflux. Preferably, the treatment temperature is from about 60° F. to about 200° F., and more preferably from about 120° F. to about 180° F.

The dicarboxylic acid treatment of this invention is combined with steaming. Steam treatment may be done prior to, concurrent with or after dicarboxylic acid treatment. Steam treatment after dicarboxylic acid treatment is preferred.

The zeolite sample is exposed to steam at a partial pressure in the range of from about 0.01 to about 10 atm, and preferably in the range of from about 0.5 to about 2 atm and at a temperature in the range of from about 600° F. to about 1200° F., and preferably in the range of from about 900° F. to about 1100° F.

Steaming is generally for as long as required to provide the desired dealumination. The steam treatment time is a least about 1 hour, preferably the steam treatment time is at least about 3 hours, and more preferably at least about 10 hours.

The zeolite may be contacted with steam and dicarboxylic acid in multiple alternate cycles of steaming and acid treatment until the desired dealumination is achieved.

In a further embodiment, more than one acid treatment step may be employed in conjunction with steaming for enhanced dealumination.

The dealuminated zeolites have a lower acidic activity than the starting materials since acidic activity is related to the number of sites available for protonation and removal of aluminum reduces the proportion of these sites. As is known in the art and used in the specification, the acidity of the catalyst may be measured by its Alpha Value.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

The dicarboxylic acid/steam treatment of this invention results in the production of dealuminated mordenite having an Alpha Value below about 30, preferably below about 20, and more preferably below about 12.

The dealuminated products obtained by the method of this invention have increased silica to alumina ratios from the starting mordenite. Generally, the silica to alumina ratio of the dealuminated product is in the range of from about 150 to about 1000, and preferably from about 400 to about 600.

Ammonium exchange, a conventional sodium removal method, is not required in the process of this invention. The dicarboxylic acid treatment removes sodium along with the aluminum.

The dicarboxylic acid/steam treatment of this invention may also be combined with other conventional dealumination techniques, such as chemical treatment.

Examples 1 and 2 illustrate the process of the present invention. Examples 3, 4, 5, 6 and 7 are comparative examples.

EXAMPLE 1

65 parts by weight on a dry basis of TEA mordenite, prepared in accordance with U.S. Pat. No. 4,052,472, incorporated herein by reference, is mixed with 35 parts by weight on a dry basis of commercial silica (Ultrasil). The material is extruded to form 1/16" cylindrical pellets. The pellets are ammonium exchanged and calcined at 900° F. in $N_2$ for 3 hours followed by air at 1000° F. for 3 hours. The calcined extrudate referred to henceforth as material A has the following properties:

| | |
|---|---|
| Sodium, ppmw | 90 |
| Alpha Value | 331 |
| $Al_2O_3$, wt % | 2.6 |

EXAMPLE 2

A sample of material A as set forth in Example 1 is slurried with 8 cc oxalic acid/ cc catalyst of a 2.0M oxalic acid solution at 180° F. for 2 hours. The oxalic acid-treated catalyst is dried at 250° F. for 8 hours and calcined in air for 3 hours at 1000° F. The oxalic acid-treated catalyst has an Alpha Value of 133. The oxalic acid-treated catalyst is then exposed to steam, 0 psig at 1025° F. for 24 hours. The oxalic acid/steam-treated catalyst has the following properties:

| | |
|---|---|
| Alpha Value | 11 |
| $Al_2O_3$, wt % | 0.43 |

EXAMPLE 3

A sample of material A as set forth in Example 1 is exposed to steam, 0 psig at 1025° F. for 24 hours. The steam-treated catalyst has the following properties:

| Alpha Value | 23 |
|---|---|
| $Al_2O_3$, wt % | 2.9 |

(The slight increase in the $Al_2O_3$ wt. % from untreated to steam-treated catalyst is the result of about a 10% variability in the measurement.)

EXAMPLE 4

A sample of material A as set forth in Example 1 is treated with 1N nitric acid at room temperature for 1 hour. The acid-treated catalyst is washed with water. The nitric acid/water wash steps are repeated for a total of two nitric acid treatments. The nitric acid treated catalyst has the following properties:

| Alpha Value | 152 |
|---|---|
| $Al_2O_3$, wt % | 1.9 |

EXAMPLE 5

A sample of material A as set forth in Example 1 is treated with 1N hydrochloric acid at room temperature for 1 hour. The acid-treated catalyst is washed with water. The hydrochloric acid/water wash steps are repeated for a total of two hydrochloric acid treatments. The hydrochloric acid treated catalyst has the following properties:

| Alpha Value | 163 |
|---|---|
| $Al_2O_3$, wt % | 2.1 |

EXAMPLE 6

A sample of material A as set forth in Example 1 is treated with 3.3 parts by weight EDTA in 100 parts by weight water at room temperature for 1 hour. The EDTA-treated catalyst is washed with water. The EDTA/water wash steps are repeated for a total of two EDTA treatments. The EDTA treated catalyst has the following properties:

| Alpha Value | 197 |
|---|---|
| $Al_2O_3$, wt % | 2.4 |

EXAMPLE 7

A sample of material A as set forth in Example 1 is exposed to steam, 0 psig at 1025° F. for 24 hours. This steamed material is then treated with 1N nitric acid at room temperature for 1 hour. The acid-treated catalyst is washed with water. The nitric acid/water wash steps are repeated for a total of two nitric acid treatments. This twice-acid-treated sample is then exposed to steam, 0 psig at 1025° F. for an additional 24 hours. The steam/nitric acid/steam-treated catalyst has an Alpha Value of 24.

The results in Examples 4, 5 and 6 show an increased reduction in acidity with oxalic acid over nitric acid, hydrochloric acid or EDTA. The combination of oxalic acid/steam treatment also represents a significant reduction in acidity from steam treatment as shown in Example 3 and the combination of mineral acid and steam treatment as shown in Example 7.

Changes and modifications in the specifically described embodiments can be carried out without departing from the scope of the invention which is intended to be limited only by the scope of the appended claims.

What is claimed is:

1. A process for the dealumination of a zeolite having the structure of mordenite, which comprises contacting said zeolite having the structure of mordenite with dicarboxylic acid and steaming for a sufficient time to effect dealumination wherein the dealuminated zeolite having the structure of mordenite has an Alpha Value of below about 20.

2. The process of claim 1 wherein said steaming is prior to said contacting with dicarboxylic acid.

3. The process of claim 1 wherein the dealuminated zeolite having the structure of mordenite has a silica to alumina ratio in the range of from about 150 to about 1000.

4. The process of claim 1 wherein the dealuminated zeolite having the structure of mordenite has a silica to alumina ratio in the range of from about 400 to about 600.

5. The process of claim 1 wherein said zeolite having the structure of mordenite is TEA mordenite.

6. The process of claim 1 wherein said dicarboxylic acid is in solution.

7. The process of claim 6 wherein said solution of dicarboxylic acid is at a volume ratio of solution to catalyst containing said zeolite of at least about 1:1.

8. The process of claim 1 wherein said dicarboxylic acid is an aqueous dicarboxylic acid solution.

9. The process of claim 1 wherein said dicarboxylic acid is in a concentration in the range of from about 0.01M to about 4M.

10. The process of claim 1 wherein said dicarboxylic acid is selected from the group consisting of oxalic, malonic, succinic, glutaric, adipic, maleic, phthalic, isophthalic, terephthalic, fumaric, tartaric and mixtures thereof.

11. The process of claim 1 wherein said contacting with dicarboxylic acid is for a time of at least about 10 minutes.

12. The process of claim 1 wherein said contacting with dicarboxylic acid is at a temperature in the range of from about 60° F. to about 200° F.

13. The process of claim 1 wherein said zeolite having the structure of mordenite is exposed to steam at a pressure in the range of from about 0.01 to about 10 atm and at a temperature in the range of from about 600° F. to about 1200° F.

14. The process of claim 1 wherein said steaming is for a time of at least about 3 hours.

15. The process of claim 1 wherein said zeolite having the structure of mordenite is incorporated with a binder prior to said dealumination.

16. The process of claim 15 wherein said binder is silica.

17. A process for the dealumination of a zeolite having the structure of mordenite, which comprises contacting said zeolite having the structure of mordenite with oxalic acid and steaming for a sufficient time to effect dealumination wherein the dealuminated zeolite having the structure of mordenite has an Alpha Value of below about 20.

18. The process of claim 17 wherein said zeolite having the structure of mordenite is TEA mordenite.

19. The process of claim 18 wherein the dealuminated TEA mordenite has an Alpha value of below about 12.

20. The process of claim 1 wherein said steaming is concurrent with said contacting with dicarboxylic acid.

21. The process of claim 1 wherein said steaming is after said contacting with dicarboxylic acid.

* * * * *